Jan. 9, 1951 A. L. SAMUEL 2,537,862

HIGH-VOLTAGE PULSE GENERATOR

Filed July 9, 1943

INVENTOR
A. L. SAMUEL

BY E. V. Griggs
ATTORNEY

Patented Jan. 9, 1951

2,537,862

UNITED STATES PATENT OFFICE 2,537,862

HIGH-VOLTAGE PULSE GENERATOR

Arthur L. Samuel, Summit, N. J., assignor to Bell Telephone Laboratories, Incorporated, New York, N. Y., a corporation of New York Application July 9, 1943, Serial No. 494,025

12 Claims. (Cl. 315—14)

This invention relates to electronic translating devices and particularly such devices which are pulsed, a term denoting that the output power of the device may be delivered in pulses generally of short duration and at a relatively high rate during each pulse. The peak power which may thus be delivered is much higher than the continuous rating of the device on account of the intermittent nature of the load. One method of producing the desired high peaks of power is to impress a high voltage on the device during the pulse period by the discharge of a condenser or other means. The voltage so applied is generally limited to that of the charge on the condenser or to the voltage of the power supply system used. It is often desired that this applied voltage be as high as practicable in order that the power generated or radiated during the pulse be high. It is the purpose of this invention to make available during the pulse a voltage higher than that of the condenser charge or of the power supply system. An obvious advantage of this is that the power supply system need not be designed for the maximum pulse voltage.

A principal object of the invention therefore is to provide in an electronic device a pulse voltage higher than the voltage of the primary power source which may be a battery, a rectifier, a generator or other type of direct current source.

A related object is to minimize the requirement of the power source for a given requirement of pulse power.

Another object is to make available pulse power at a voltage substantially double that of the primary power source.

A further object is to attain the desired pulse voltage by electronic switching means whereby pulses may be produced at a relatively high frequency.

In apparatus where the output is delivered in pulses it is generally desired that the peak power of the pulse be high and this ordinarily means that the energizing power which is applied in the form of a pulse must be supplied at a voltage as high as the insulation of the apparatus or other practical considerations will permit. Among such considerations may be requirements on the power supply equipment of safety, portability, weight, size, etc. It is obvious that where the pulse voltage can be no greater than the voltage of the power supply equipment serious limitations of the output power may be imposed by such considerations. The present invention relieves this situation to a considerable degree by making possible a pulse voltage substantially double that of the power supply equipment. Briefly, this is accomplished by charging a condenser from the power supply source and discharging it in series with the source. The invention and its various features will be more fully understood from the following detailed description and the accompanying drawing, in which:

Fig. 2 shows the invention applied to a resonant cavity type of high frequency amplifier circuit; and.

Figure 1:
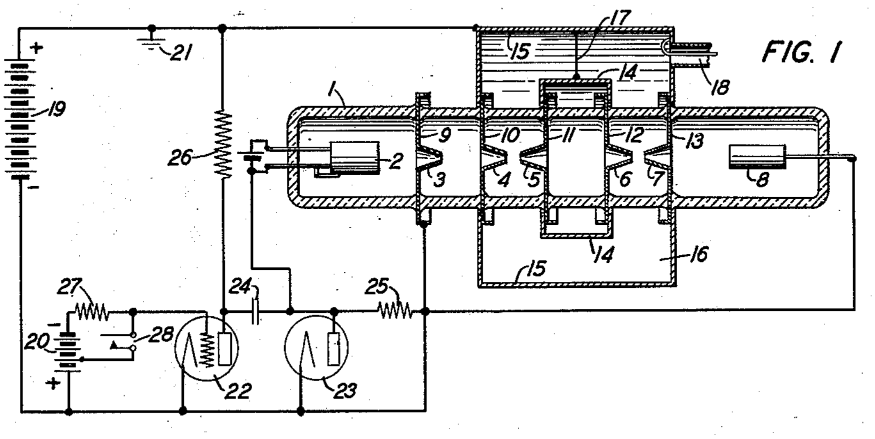
Fig. 1 shows the invention applied to a resonant cavity type of high frequency oscillator circuit.
Figure 2:
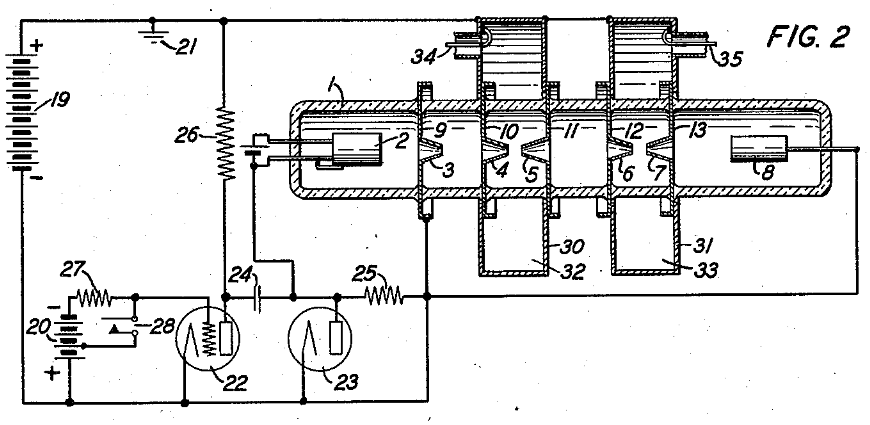
Figure 3:
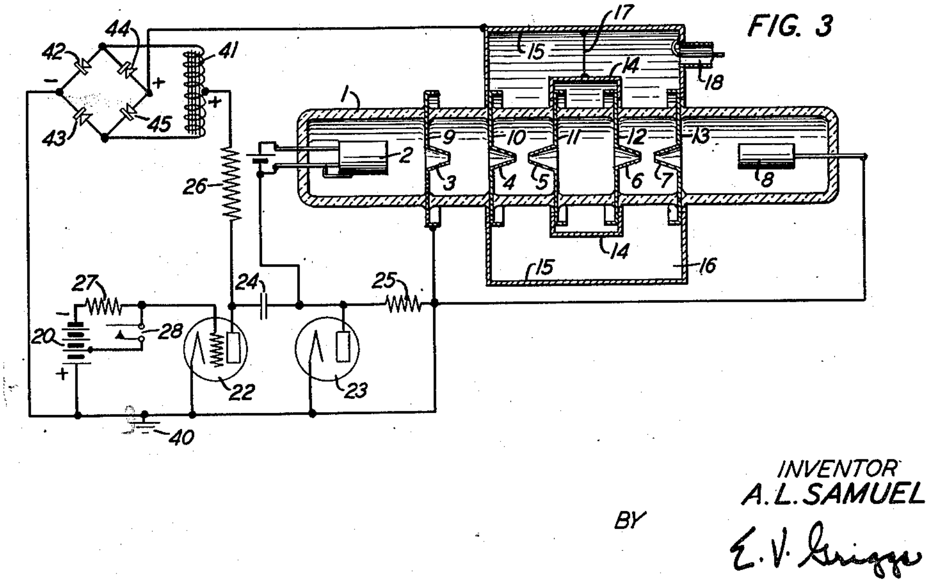
Fig. 3 shows modifications of the Fig. 1 arrangement as regards type of power supply and method of grounding the circuit.

With reference to Fig. 1, the resonant cavity type of oscillator shown is similar to that shown in Fig. 3 of United States Patent 2,281,717 issued to the applicant, May 5, 1942. In the tube comprising the evacuated envelope 1 electrons from the cathode 2 are projected through the electron permeable electrodes 3, 4, 5, 6 and 7 to the collector 8. The electrodes 3, 4, 5, 6 and 7 are connected to and supported by the metallic discs 9, 10, 11, 12 and 13 sealed into the envelope 1. The coaxial conducting members 14 and 15 connect with the discs 11, 12 and 10, 13 respectively, to enclose the space 16 and form a resonant cavity. To facilitate assembly these members, 14 and 15, (and similarly members 30 and 31 of Fig. 2), may be split along the axis into two semicircular halves which are clamped together and to the discs to make good electrical connections at the joints. The electrodes 4, 5, 6 and 7 form reentrant portions of the cavity shell and when the cavity is energized at high frequency the high frequency electric field within extends into the gaps between the electrodes 4 and 5 and between electrodes 6 and 7 where it may interact with the electron stream. This oscillator operates on the velocity variation-drift space grouping principle. In the gap between electrodes 4 and 5 the high frequency field impresses velocity variations upon the electrons in the stream. The electrons then drift through the field free space between electrodes 5 and 6 where electron grouping takes place due to higher velocity electrons overtaking lower velocity ones and lower velocity electrons lagging to group with later higher velocity ones. As a result the originally uniform electron stream acquires density variations at the frequency of the field within the cavity by the time it reaches the gap between electrodes 6 and 7. Consequently, upon interaction between the stream and the field between electrodes 6 and 7, more energy is given to the field than is taken from it and the field is sustained to excite the input gap between electrodes 4 and 5, and also to deliver high frequency energy to an output circuit comprising the coaxial conductor 18. The connector 17 serves to determine the potential of the inner portion of the shell of the cavity. The electrode 3 is to control and accelerate the electrons emitted from the cathode 2. A device of the type of this oscillator operates with the electrodes such as 3, 4, 5, 6, 7 and 8 at potentials positive with respect to the cathode and the negative terminal of the potential source such as 19 is usually connected to the cathode. According to this invention, as shown in Fig. 1, the negative terminal of the potential source 19 is connected to the control electrode 3 and the positive terminal is connected to the other electrodes through the cavity shell and to ground 21 so that the cavity shell is at ground potential.

A number of electrical paths in parallel between the cathode 2 and the electrode 3 are provided by portions of the pulsing circuit. One of these paths is through resistor 25, one is through the electronic valve, rectifier or diode 23 and one is through the capacitor 24 and the three-electrode tube 22 in series. Both tubes 22 and 23 being unilateral conducting devices act in the nature of check valves in that current can flow through them in only one direction. Tube 22 having a control element or grid may be controlled so that in the circuit it will be non-conducting in both directions when desired. The tube 22 may be termed the pulse amplifier. It may be operated in any of a number of known ways and it may be the last stage of a multistage amplifier. The excitation of the grid or control element may be from a multivibrator or any source which will produce excitation by impulses at the desired frequency. Since the type of impulse excitation is immaterial to the invention, a simple keying device to apply impulses to the grid is shown in the figures as an example and to illustrate the operation of the complete device. The grid impulses are produced by the operation of the key 28 which functions to change the bias on the grid. When the key is open the grid is connected through the resistor 27 to the biasing source 20 such that the negative bias on the grid is sufficient to block the tube 22 or to make the plate cathode impedance so high that little or no current can flow through it from the capacitor 24 or from the source 19. When the key is closed the grid is connected directly to the source 20 such that the negative bias is reduced making the plate cathode impedance of the tube 22 low so that current may readily flow therebetween from the capacitor 24. Thus pulsing by the operation of the key 28 has the effect of opening and closing the circuit from the plate to the cathode of tube 22 or of opening and closing the circuit between the junction of capacitor 24 and resistor 26 and the electrode 3 of the high frequency tube. The resistors 25 and 26 are of relatively high resistance to avoid excessive loss as high potentials are impressed on them during the pulse when the key 28 is closed. Resistor 26 is for charging the capacitor 24 from the source 19 and resistor 25 is simply a "bleeder" between electrodes 2 and 3. The valve 23 provides a unidirectional path for the charging current of capacitor 24 and is an open circuit to the discharge current when the capacitor is discharged through the tube 22.

When the key 28 is open, the circuit through the tube 22 is open. The potential of source 19 is applied between the electrode 3 and the electrodes 4, 5, 6 and 7. Electrode 8 is connected to electrode 3. The cathode 2 is connected to electrode 3 through resistor 25 and valve 23 and since there is no voltage impressed on either resistor 25 or valve 23 and the cathode 2 and the electrode 3 are at the same potential, there is no electron flow and no high frequency output. The capacitor 24 is charged from source 19 through the resistor 26 and the valve 23.

Now, when the key is closed to produce a pulse of high frequency energy, the tube 22 becomes conducting and connects the positive terminal of the capacitor 24 to electrode 3 so that the potential of the charged capacitor is impressed between the electrode 3 and cathode 2 and across the resistor 25 thereby making the cathode 2 negative with respect to the electrode 3 by the potential of the capacitor which is essentially that of the source 19. Thus electrodes 3 and 8 are made positive with respect to the cathode 2 by approximately the potential of source 19 and the electrodes 4, 5, 6 and 7 are made positive with respect to the cathode 2 by approximately twice the potential of source 19. Under this conditions electrons flow from the cathode, the resonant cavity is excited and a high frequency output is delivered at 18. This continues until the key 28 is opened which terminates the pulse of high frequency output.

If the key 28 is closed too long the pulse will be terminated by the capacitor 24 becoming discharged. Ordinarily the period of a pulse is so short that its termination is not dependent upon the discharge of the capacitor. Also as previously mentioned, the pulses are not ordinarily controlled by such a crude mechanism as the key shown to illustrate the principle of the invention but rather by some electrical wave so that the state of charge of the capacitor is not a factor. However the manner of its control, the tube 22 acts as an electronic switch to connect and disconnect the charged capacitor 24 between the cathode 2 and the electrode 3 to produce each pulse of high frequency output.

It will be observed that during the pulse the potential effective in producing high frequency energy is substantially twice the potential of the available source 19, being less than that only by the potential drop in the electronic switch 22 and any drop such as in resistor 26 which prevents the capacitor 24 from charging to the potential of the source 19.

Fig. 2 is a modification of Fig. 1 in that the high frequency circuit is an amplifier rather than an oscillator.

The high frequency amplifier circuit is very similar to the oscillator circuit of Fig. 1 and is the same as shown in Fig. 1 of the previously mentioned United States Patent 2,281,717 issued to the applicant May 5, 1942. The amplifier comprises two separate resonant cavities. The input cavity space 32 is bounded by the generally cylindrical shell member 30, the discs 10 and 11 to which it is connected and the electrodes 4 and 5 supported by the discs 10 and 11. This cavity is excited from the coaxial conductor 34. The output cavity space 33 is bounded by the generally cylindrical shell member 31, the discs 12 and 13 to which it is connected and the electrodes 6 and 7 also supported by the discs 12 and 13. The output from this cavity is delivered through the coaxial conductor 35. As in the oscillator circuit of Fig. 1 the electron stream has velocity variations impressed upon it by the high frequency field between electrodes 4 and 5, thereby acquires density variations in the drift space between electrodes 5 and 6 and contributes energy to the high frequency field between electrodes 6 and 7 in the output cavity. High frequency energy is then delivered through the output conductor 35.

The pulsing circuit functions the same as in the circuit of Fig. 1.

Fig. 3 shows another modification of Fig. 1 in which a rectifier is shown rather than a battery as a direct current power source and in which only half of the total power source potential is applied to the pulsing circuit. The use of a rectifier type of power source is not essential to the type of operation where less than the total potential is applied to the pulsing circuit. It is obvious that the lead connecting the pulsing circuit through resistor 26 to the power source may be connected to a tap on the battery source 19 rather than as shown in Figs. 1 and 2 and it is equally obvious that a rectifier type of power source may be substituted for the battery type 19 in those figures. The rectifier is shown in Fig. 3 to illustrate the alternative as well as the lower potential operation of the pulsing circuit.

The rectifier power source is shown in schematic form and as a conventional type of single phase, full wave, double potential rectifier comprising the four rectifier tubes 42, 43, 44 and 45 and the transformer secondary winding 41. To simplify the drawing details of the rectifier including the primary winding of the transformer are not shown. The full positive direct current potential of the rectifier is applied from the junction between tubes 44 and 45, to the cavity shell 15 and thence to the electrodes 4, 5, 6 and 7 of the high frequency tube comprising the envelope 1. Half of the full positive direct current potential of the rectifier is applied from the tap in the center of the transformer secondary winding 41 through resistor 26 to the junction between the pulse amplifier tube 22 and the capacitor 24. The negative direct current terminal of the rectifier (the junction between tubes 42 and 43) is connected to the electrode 3 and the cathodes of tubes 22 and 23 just as the negative terminal of the battery source 19 is connected in Fig. 1. It may be noted that in Fig. 3 the connection to ground at 40 is from the negative side of the direct current source rather than from the positive side of the direct current source as in Figs. 1 and 2. This is an alternative method of grounding and one in which the cavity shell is not at ground potential as it is in Figs. 1 and 2.

The operation of Fig. 3 is the same as that of Fig. 1 with the exception that the capacitor 24 is charged to the lower potential in Fig. 3 and the total potential applied between the cathode 2 and electrodes 4, 5, 6 and 7 during a pulse is approximately one and one-half times that of the potential source rather than twice that as in Fig. 1.

In all of the figures it will be seen that during the pulse period, electrical energy stored in the charged capacitor 24 is applied to the high frequency tube through the resistance of tube 22 so that, as previously mentioned, the potential thus applied to the high frequency tube is less than the potential of the charged capacitor by the potential drop in the tube 22. On account of this the maximum pulse potential on the high frequency tube is somewhat less than twice the source potential in Figs. 1 and 2 and less than one and one-half times the rectifier potential in Fig. 3.

The utility of the pulsing means described is not limited to the arrangements shown in the illustrative figures but is applicable to any electronic device having a control electrode such as 3 which can participate in both the blocking and the acceleration of the electron stream. While the preferred embodiments illustrated show the invention applied to high frequency circuits employing a multielement discharge tube, it is obvious that it may be used in connection with a discharge tube having as few as three elements such as the ordinary triode.

What is claimed is:

1. In combination, an electron discharge tube comprising a cathode and a plurality of electrodes for producing a stream of electrons from the cathode, a direct current electrical potential source, means connecting the said source between two of the said electrodes, an electrical capacitor connected to said potential source, and means controllably connecting the charged said capacitor between the cathode and one of the said two electrodes between which potential from the potential source is applied and such that the more negative terminal of the capacitor is connected to the cathode, whereby, the potential of the charged capacitor is in series aiding with the potential between the said two electrodes.

2. In combination, an electron discharge tube comprising a cathode and a plurality of electrodes for producing a stream of electrons from the cathode, a direct current electrical potential source, means connecting the said source between two of the said electrodes, an electrical capacitor connected to said potential source, and means comprising an electronic switch controllably connecting the charged said capacitor between the cathode and one of the said two electrodes between which potential from the potential source is applied and such that the more negative terminal of the capacitor is connected to the cathode, whereby, the potential of the charged capacitor is in series aiding with the potential between the said two electrodes.

3. A high frequency device comprising an electron discharge tube and which is capable of delivering high frequency energy output if an electron stream is produced in the discharge tube, a cathode and a plurality of electrodes in the discharge tube capable if appropriately energized of producing an electron stream therein, the electrodes being in alignment along the path of the electron stream, means for energizing the said electrodes appropriately to produce an electron stream in the discharge tube, the said energizing means comprising a direct current source connected between two of the electrodes such that the one nearer the cathode is the more negative whereby an electric field is produced therebetween which is capable of accelerating the said electron stream in the tube but which does not extend into the region of the cathode to be effective in initiating a flow of electrons, the said energizing means comprising also an electrical capacitor connected to said direct current source, and means controllably connecting the charged said capacitor between the cathode and one of the said electrodes to apply a potential difference therebetween to initiate a stream of electrons and to apply between the cathode and the more positive one of the said electrodes connected to the direct current source a potential difference substantially greater than that of the said source.

4. A high frequency device comprising an electron discharge tube and which is capable of delivering high frequency energy output if an electron stream is produced in the discharge tube, a cathode and a plurality of electrodes in the discharge tube capable if appropriately energized of producing an electron stream therein, the electrodes being in alignment along the path of the electron stream, means for energizing the said electrodes appropriately to produce an electron stream in the discharge tube, the said energizing means comprising a direct current source connected between two of the electrodes such that the one nearer the cathode is the more negative whereby an electric field is produced therebetween which is capable of accelerating the said electron stream in the tube but which does not extend into the region of the cathode to be effective in initiating a flow of electrons, the said energizing means comprising also an electrical capacitor connected to said direct current source, and means comprising an electronic switch controllably connecting the charged said capacitor between the cathode and one of the said electrodes to apply a potential difference therebetween to initiate a stream of electrons and to apply between the cathode and the more positive one of the said electrodes connected to the direct current source a potential difference substantially greater than that of the said source.

5. In combination, an electron discharge tube in which an electron stream may be produced having a cathode and a plurality of electrodes in alignment along the path of the electron stream, and means for producing an electron stream in the tube comprising a source of direct current connected to at least two of the electrodes to produce an electron accelerating field in a portion of the electron path remote from the cathode, an electrical capacitor connected to the said direct current source, and to means controllably connecting the charged said capacitor between the cathode and the more negative of the said two electrodes connected to the direct current source to produce an electron accelerating field therebetween and to produce a potential difference between the cathode and the more positive of the said two electrodes which is substantially greater than the potential of the direct current source.

6. In combination, an electron discharge tube having a source of electrons and a predetermined path for an electron stream therefrom, means connected to electrodes spaced along said path remote from the electron source for applying over a portion of the path remote from the electron source a difference of electrical potential of such polarity as to be capable of accelerating an established electron stream, and means controllably connected to the electron source and to an electrode along said path between the electron source and said remote path portion and controllable independently of the application of potential difference by first said means for applying at will over another portion of the electron path adjacent to the said remote portion on the side toward the electron source an additional difference of potential of such polarity as to accelerate an electron stream from said source of electrons whereby an electron stream is established and is accelerated by the two potential differences additively.

7. In combination, an electron discharge tube having a source of electrons and a predetermined path for an electron stream therefrom, means connected to electrodes spaced along said path remote from the electron source for applying a potential difference over a portion of the electron path remote from the electron source and means controllably connected to the electron source and to an electrode along said path between the electron source and said remote path portion for applying at a time independent of the time of application of potential by the first said means an additional potential difference over another portion of the electron path adjacent to the said remote portion on the side toward the electron source in such polarity that the two potential differences are additive in series and the total potential difference over the path is substantially greater than either of the two applied components thereof.

8. In a device in which a stream of electrons is produced intermittently, an electron discharge tube comprising an electron emitting cathode, an electron permeable control electrode and at least one other electrode all arranged in the order named, a unilateral conducting device connected between the cathode and the said permeable control electrode whereby electrical current flowing through the unilateral conducting device will be in the direction from the cathode external to the discharge tube, an electrical capacitor and a unilateral conducting device with a control element capable when properly energized of rendering it either conducting or non-conducting connected in series between the cathode and the said permeable electrode whereby electrical current flowing through this second-mentioned unilateral conducting device will be in the direction from the cathode external to the discharge tube, a direct current source of electrical energy connected with its negative terminal to the said permeable control electrode and a positive terminal to at least one other electrode and a positive terminal through a resistor to the junction between the capacitor and the second-mentioned unilateral conducting device whereby the capacitor may be charged through the resistor and the first-mentioned unilateral conducting device, and means comprising the control element of the second-mentioned unilateral conducting device for rendering that device conducting whereby the charged capacitor is connected therethrough between the cathode and the said control electrode of the discharge tube.

9. The method of energizing in pulses an electron discharge tube having a source of electrons and a predetermined path for an electron stream therefrom which comprises maintaining over a portion of the electron path remote from the electron source a difference of electrical potential which is capable of accelerating an established electron stream and then applying intermittently at controllable predetermined times over another portion of the electron path adjacent to the said remote portion on the side toward the electron source an additional difference of potential such that an electron stream is established and is accelerated by the two potential differences in series.

10. The method of energizing in pulses an electron discharge tube having an electron source and a predetermined path for an electron stream therefrom which comprises applying a potential difference over a portion of the electron path remote from the electron source and then applying in a controllable predetermined manner an additional potential difference over another portion of the electron path adjacent to the said remote portion on the side toward the electron source such that the two potential differences are in series and the total potential difference over the path is substantially greater than either of the two applied components thereof.

11. In combination, an electron discharge tube comprising a cathode and a plurality of electrodes for producing a stream of electrons from the cathode along a path including said electrodes, a direct current electrical potential source connected to two of said electrodes, an electrical capacitor connected to said potential source whereby it may be charged therefrom and an electrical circuit operable to connect at will the charged capacitor between the cathode and one of the said two electrodes connected to the potential source with the more negative terminal of the capacitor connected to the cathode whereby the potential of the charged capacitor is in series aiding with the potential between the said two electrodes.

12. The method of energizing in pulses an electron discharge tube having an electron source and a predetermined path for an electron stream therefrom which comprises applying a potential difference over a portion of the electron path remote from the electron source and then applying during the periods of the desired pulses an additional potential difference over the portion of path between the electron source and the said remote portion of path in such polarity that the two potential differences are in series aiding.

ARTHUR L. SAMUEL.

REFERENCES CITED

The following references are of record in the file of this patent:

UNITED STATES PATENTS

| Number | Name | Date |
|---|---|---|
| 1,992,908 | Cockcroft et al. | Feb. 26, 1935 |
| 2,048,094 | Applebaum | July 21, 1936 |
| 2,061,011 | Vingerhoets | Nov. 17, 1936 |
| 2,145,727 | Lloyd, Jr. | Jan. 31, 1939 |
| 2,250,511 | Varian et al. | July 29, 1941 |
| 2,267,233 | Elstrom | Dec. 23, 1941 |
| 2,281,717 | Samuel | May 5, 1942 |
| 2,317,140 | Gibson | Apr. 20, 1943 |
| 2,402,364 | Buss | June 18, 1946 |
| 2,407,272 | Hart | Sept. 10, 1946 |